United States Patent
Caruana

(10) Patent No.: US 8,342,417 B2
(45) Date of Patent: Jan. 1, 2013

(54) METHOD FOR OPTIMIZED READING OF CERTIFICATES HAVING RADIOFREQUENCY TRANSPONDERS, SET OF SUITABLE CERTIFICATES AND DOCUMENT CONTAINING THE SAME

(75) Inventor: Jean-Paul Caruana, Marseilles (FR)

(73) Assignee: Gemalto SA, Meudon (FR)

( * ) Notice: Subject to any disclaimer, the term of this patent is extended or adjusted under 35 U.S.C. 154(b) by 289 days.

(21) Appl. No.: 12/666,876

(22) PCT Filed: Jun. 24, 2008

(86) PCT No.: PCT/EP2008/058005
§ 371 (c)(1),
(2), (4) Date: May 5, 2010

(87) PCT Pub. No.: WO2009/003871
PCT Pub. Date: Jan. 8, 2009

(65) Prior Publication Data
US 2010/0213261 A1 Aug. 26, 2010

(30) Foreign Application Priority Data
Jun. 29, 2007 (EP) ..................................... 07301182

(51) Int. Cl.
*G06K 19/06* (2006.01)
(52) U.S. Cl. ...................................................... 235/494
(58) Field of Classification Search .......... 235/487–495
See application file for complete search history.

(56) References Cited

U.S. PATENT DOCUMENTS

| 6,173,900 B1 | 1/2001 | Yoshigi et al. |
| 7,059,535 B2 * | 6/2006 | Rietzler ........................ 235/492 |
| 7,612,677 B2 * | 11/2009 | Rietzler ........................ 235/492 |
| 2003/0141590 A1 * | 7/2003 | Kamiya et al. ................ 257/730 |
| 2009/0166428 A1 * | 7/2009 | Phillips et al. ................ 235/487 |

FOREIGN PATENT DOCUMENTS

| EP | 0 997 842 A2 | 5/2000 |
| EP | 1 018 703 A1 | 7/2000 |
| EP | 2 887 712 A1 | 12/2006 |
| FR | 2 890 213 A1 | 3/2007 |
| WO | 2005/104204 A1 | 11/2005 |

OTHER PUBLICATIONS

International Search Report (PCT/ISA/210) dated Aug. 7, 2009 for PCT/EP2008/058005.
Written Opinion (PCT/ISA/237) dated Aug. 7, 2009 for PCT/EP2008/058005.

* cited by examiner

*Primary Examiner* — Thien M Le
*Assistant Examiner* — Christle Marshall
(74) *Attorney, Agent, or Firm* — Buchanan Ingersoll & Rooney PC

(57) ABSTRACT

The invention relates to a method for reading electronic certificates positioned in a document, each certificate comprising a support bearing an antenna linked to a microcircuit. The document has sheets of a determined format articulated around a hinge. The antennas are dimensioned to a format less than that of a half-sheet. The certificates are arranged at most in pairs on a sheet so that the antennas are spaced apart along a longitudinal axis of the sheet. The invention also relates to a set of certificates and the document containing the certificates.

8 Claims, 4 Drawing Sheets

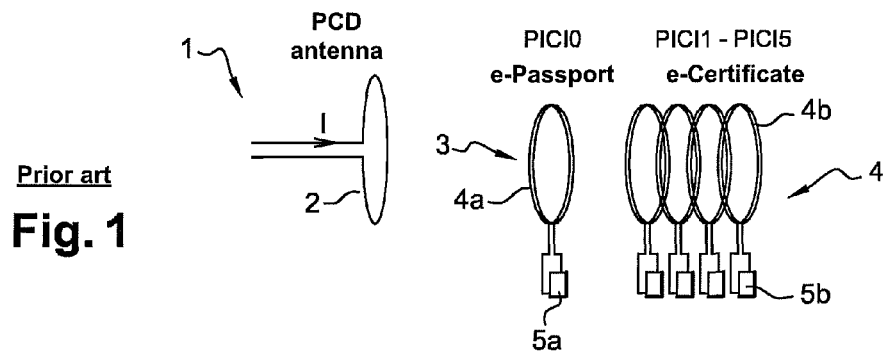
Prior art
Fig. 1
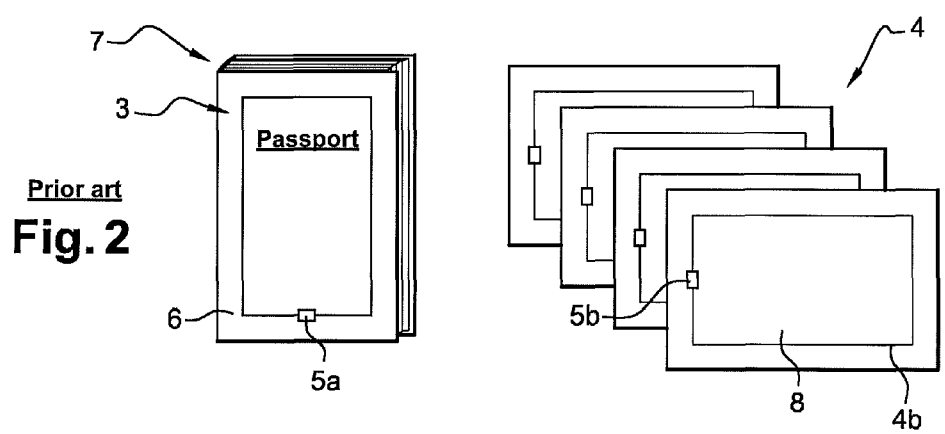
Prior art
Fig. 2
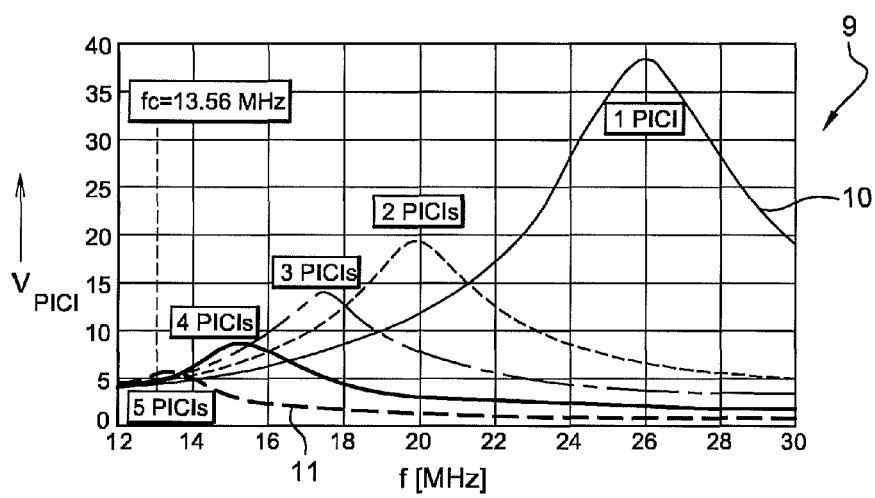
Prior art  Fig. 3

METHOD FOR OPTIMIZED READING OF CERTIFICATES HAVING RADIOFREQUENCY TRANSPONDERS, SET OF SUITABLE CERTIFICATES AND DOCUMENT CONTAINING THE SAME

The invention relates to a method for an optimized reading of electronic certificates having radiofrequency transponders, a set of suitable certificates having transponders suitable for this optimized reading and an arrangement of documents such as passports arranged with such certificates.

More particularly, the invention relates to improving communications with a transponder liable to be surrounded by several transponders. This happens more particularly when such transponders are in particular fixed to a set of sheets in a document.

A preferred application of the invention lies in the reading of electronic travelling documents of the contactless type such as electronic passports, with the transponders being in the form of electronic certificates positioned together in the document. More particularly, such documents and certificates are complying with the ICAO's (acronym for International Civil Aviation Organization) specifications and the standard ISO/IEC 14443. This is the reason why, in the following description, the term "certificate" or "e-certificate" will be indifferently used as being able to comprise or to be a radiofrequency transponder. Similarly, the word "passport" can indifferently represent any document or set of sheets, or even support structures or any other device grouping a set of transponders.

Travelling documents such as electronic passports and/or electronic certificates comprise or are composed of, on the one hand, a paper document on which information relating to the holder of said document is written and, on the other hand, a contactless electronic chip which also contains secured information relating to the same holder.

A still pending problem occurs as soon as the travelling document of the electronic passport type must also comprise several electronic certificates.

As a matter of fact, because of the principles used by such contactless electronic chips, the increase in the number of electronic certificates in the document makes their simultaneous reading more and more difficult when and as their number increases and can even make it impossible to operate them as soon as the number exceeds 4 or 5 certificates.

The application for the patent FR-2 887 712 is known, which describes a method for the optimized reading of transponders, wherein a particular adjustment of a passive antenna and frequency tunings are carried out. This document also provides for a random position of the transponders on a page corresponding to a page of the document so that they overlap as little as possible in the set. A set or several randomly established certificate supports can comprise certificates positioned in the same way or overlapping from one support to the other.

The application for an international patent WO 2005/104024 discloses a document bearing radiofrequency transponders and electromagnetic shielding elements. The transponders are positioned on the sheets of the document so as to be protected by a shielding element positioned on another sheet when the document is closed.

The need expressed for the electronic travelling documents is that said documents can contain a maximum of electronic contactless certificates which can be simultaneously operated when they are submitted to a magnetic field from a contactless reader. The reader and the travelling documents must comply with the standard ISO/IEC 14443 and preferably comprise as little modification as possible and the certificates must be easily implemented.

The specifications of the contactless electronic certificate or certificates require, on the one hand, that each certificate uses and interacts as little as possible with the magnetic field from the contactless reader and, on the other hand, that each one causes a variation of said magnetic field compatible with the clauses imparted by the standard ISO/IEC 14443 during the phases of responses from the certificate to the reader.

The contactless technology resulting from the standard ISO/IEC 14443 discloses the mechanisms making it possible to implement principles avoiding collisions between contactless products. These principles provide logical mechanisms making it possible to extract a contactless product among several of them when they are submitted to the same magnetic field. The condition required for the correct operation of this principle is that the reader feeds all the products to the field it generates and that it detects them.

More particularly, the contactless anti-collision mechanism is limited by the consumption and the magnetic load induced by the sum of several contactless transponders. This limits the number of electronic certificates which can be read in or out of an electronic passport.

In addition, the standard ISO/IEC 14443 contains a clause imparting to the contactless products to operate in a magnetic field range between 1.5 A/m and 7.5 A/m. This clause makes it possible for the contactless products to be operated from a magnetic field of at least 1.5 A/m.

The reader according to the standard can thus only generate a field of 1.5 A/m in the presence of the travelling document while complying with the standard. The standard ISO/IEC 14443 also imparts the minimum amplitude of the response of the contactless product for the reader to be able to detect it. This minimum amplitude is at least equal to $30/H^{1.2}$, (i.e. 18.6 mV) with H being the amplitude of the magnetic field. This value is defined from the amplitude of the side bands generated because of the modulation of the amplitude of the reader magnetic field, having a frequency of 13.56 MHz, by the contactless product, following the rhythm of the sub-carrier thereof rated at 847 Khz.

If these conditions are complied with, the contactless reader according to the standard should be able to receive the data from the contactless chip.

The current state of the art makes it possible to comply with all these conditions so long as a maximum number of a few electronic certificates are positioned in the travelling document. At present, 5 certificates seems to be a maximum if we consider the curve of response of the transponders (FIG. 3 extracted from the official document N1088 by ISO/IEC JTC1/SC17/WG8).

The inventor noted that, if more than five contactless products each complying with the standard, are positioned together in the same travelling documents, the set no longer complies with the standard ISO/IEC 14443 because of the electromagnetic couplings thereof. The complying contactless reader is no longer supposed to be able to feed or to detect the same.

This limitation to five of the number of transponders was considered by the inventors as being likely to be a drawback in the development of an electronic passport and also more generally in reading several transponders positioned together, whatever the considered application.

The inventor thus intended to improve, in general, the contactless communication with a certain number of transponders for a constant power of the reader, so as to provide a guaranteed service with respect to the state of the art; this means that because of the particular design of the certificates and a particular arrangement, the reading of the transponders under appropriate conditions can be guaranteed.

The invention also aims at providing an optimization of the number of transponders which can be read together for the electronic passport application in compliance with the ICAO's specifications more particularly the ICAO 9303 and ISO/IEC14443. New characteristics of transponders are provided for this purpose.

Therefore, assumptions or considerations from which the invention originates were disclosed by the inventor. The passport may be, or not, an electronic passport in compliance with the ICAO (internal chip or not); the e-certificate may be stuck on a page of a passport (on the face, the back or both); the functionalities of the electronic passport must not be modified by the presence of the e-certificates.

The following constraints of physical nature are also taken into account. The interoperability of the e-passports must be kept with the infrastructure of the readers; each contactless component interacts with another; each contactless component must be supplied; the reader must be able to read or to listen to each contactless component; the reader must solve the problem of collisions.

Constraints of logical nature are taken into account hereinafter. The electronic certificate (e-certificate) should be differentiated from the electronic passports; the "e-certificate" software application can be identical to or different from that of a passport.

System constraints are also taken into account, with the reader having to search for the presence of the e-certificate.

Constraints relating to interactions between contactless components are taken into account: the interaction between contactless components depends on the mutual coupling between each antenna (k), which itself depends on the current circulating in the antenna, on the distance between the antennas, on the overlapping of the antennas, on the dimensions of the antenna and on the number of windings.

The interaction between the reader and the e-certificates depends on the global antenna resulting from the e-certificates, the tuning between the reader and the global antenna resulting from the e-certificates.

The most important specifications of the ISO/IEC 14443, more particularly as regards the power of the magnetic field, are considered as the signal interface.

To solve the above-mentioned drawbacks and constraints, the invention more particularly consists not only in reducing the antenna of the certificates or the transponders but also their mutual overlapping so as to significantly reduce their over-coupling; therefore, the response from the chip is improved and the management of the anti-collision is made easier.

Thanks to such provisions, the invention makes it possible to significantly reduce the phenomenon identified as a front/back over-coupling of the certificates on a sheet or even to cancel the same insofar as the overlapping of the antennas positioned on the face and the back of a sheet of a document is eliminated. Then, over-coupling between the certificates and/or the antenna of the electronic passport is avoided and the functionality of the "e-certificate" is guaranteed.

The invention more particularly has the advantage of minimizing the interferences of the e-certificate with the electronic passport which also contains a communication antenna. The invention has the advantage of an easy emission and control of the "e-certificates".

According to a first aspect, the invention relates to a method for reading electronic certificates by an electromagnetic field reader, said certificates each comprising a support bearing an antenna linked to a microcircuit and being positioned in a document, the document comprising sheets having a determined format articulated around a hinge, the antennas being dimensioned to a format less than that of a half-sheet.

The method is distinguished in that it is provided to systematically select an arrangement of the certificates (V1a, V1b, V2a, V2b) in the document so that they are positioned at most in pairs of a sheet (P2) and so as to see the antennas (13i, 13j) spaced apart along a longitudinal axis (XF) of the sheet.

According to other characteristics, the certificates having a support with a format slightly less than or equal to that of the sheet of the document, the method comprises a step wherein two half-parts of the support of the certificate are defined on either side of the transversal center axis and the antennas are positioned inside one part, always the same from one certificate to another, then the certificates are positioned on the face and the back of the sheet, the certificates being arranged identically with respect to the free longitudinal edge of the sheet.

Another aim of the invention is also a set of electronic certificates or transponders intended for a document comprising several sheets, said certificates comprising a support having a format slightly less than or equal to that of a sheet of the document and bearing an antenna linked to a microcircuit, the support of the certificate defining two half-parts positioned on either side of a transversal bisector.

The set of certificates or transponders is distinguished in that the antennas of the certificates are all positioned in a half-part located on the same side of the support.

The invention also aims at a document comprising several sheets and electronic certificates provided with antennas arranged on the sheets, the antennas of the certificates being dimensioned so as to be comprised at the surface of a half-sheet.

The document is distinguished in that the certificates are positioned at most in pairs on a sheet on either side of a transversal center axis of the sheet so as to have the antennas of the certificates spaced apart along a longitudinal axis of the sheet.

According to other characteristics, the certificates having a support with a format slightly less than or equal to that of a sheet of a document and the support of the certificate defining two half-parts on either side of a transversal center axis, then the document is distinguished in that the support comprises the antenna inside one part, always the same from one certificate to another, and in that the certificates are positioned on the back and the face of the sheet while being arranged identically with respect to the free longitudinal edge of the sheet.

Other characteristics and advantages of the invention will appear upon reading the description given as a non limitative example and the appended drawings wherein:

FIG. 1 illustrates a system for reading electronic passports according to the prior art;

FIG. 2 illustrates an electronic passport and the various certificates of the prior art;

FIG. 3 illustrates curves of a response voltage as a function of the number of transponders in the prior art;

Figure 4:
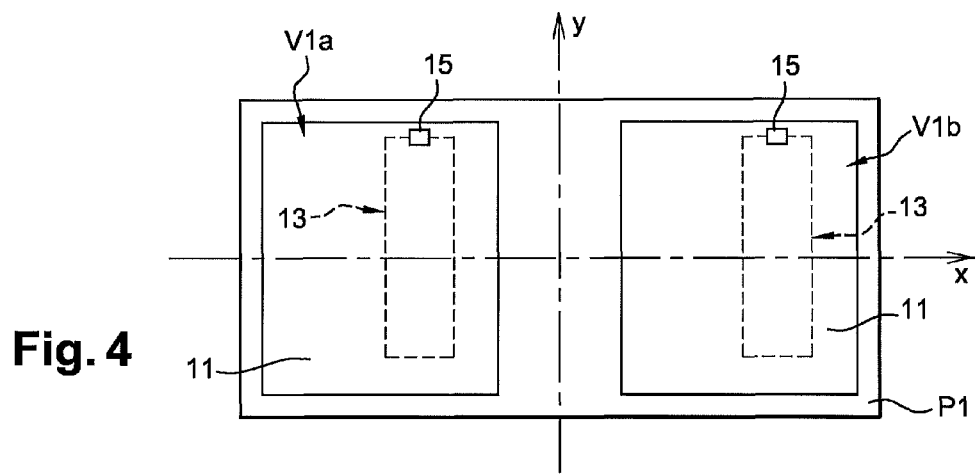
FIG. 4 illustrates an arrangement of transponders or e-certificates on a sheet of the document and complying with a first embodiment or implementation of the invention.

In FIG. 1, an existing system for reading 1 electronic passports and electronic certificates in the form of transponders of the radiofrequency type (RF) comprises a reader able to emit an interrogation field via an emitting antenna 2 and receiving a response from the transponder exposed to such field.

The passport 3 (PlClO) and each certificate 4 (PlCl1-PlCl5) comprise the same type of transponder, i.e. an electronic circuit (5a, 5b) of the RF-ID (radiofrequency identification) type connected to an antenna (4a-4b).

In FIG. 2, the transponder of the passport is buried in the cover 6 of the passport 7 and each transponder of an electronic certificate is buried in a sheet 8.

In FIG. 3, a diagram of the curves of the voltage response (10) of a transponder in the ID1 format (format of the present passports) has a peak beyond 35 volts whereas the answer in voltage of 5 transponders PlCl positioned together is close to 5 Volts. With more than 5 transponders, the voltage significantly drops and it is no longer possible to detect and read more than 5 transponders with the frequency of 13.56 MHz.

Generally speaking, within the scope of the present description, transponder means, within the scope of the following description, any identification electronic circuit using detection or communication using an electromagnetic field. Electromagnetic fields transponders are more particularly interesting when they comprise a coil connected to a capacitor or an integrated circuit or other electronic components.

The transponders more particularly comprise an electronic component such as an integrated circuit chip connected to an antenna. They can be inserted into or associated with any type of support. For example, they can be in the form of adhesive electronic labels, contactless cards; they can be buried in a packing, a document cover, a sheet or another item, etc.

The transponders are used in various economics systems such as banking (electronic purse), communication, transport, identity (e-passport, ID-card). As regards the identity, identifying a person using a radiofrequency communication with a contactless portable electronic device of the RFID type is known.

FIG. 4 shows a step of the implementation of an embodiment of the method of the invention for the optimized reading of transponders which can be in the form of electronic certificates for passports or miscellaneous accesses. From this optimized reading will result structures and/or arrangement and/or manufacturing methods of the transponders and certificates, as described hereinunder.

According to this step, the maximum of two e-certificates V1a and V1b are positioned on a page P1 of a document (not shown), such as a passport, also called a travelling document.

Other forms of documents or final supports of transponders or labels can be considered such as leaflets, card decks, etc.

According to one characteristic of the method, the electronic certificates V1a, V1b may be both on the same face of the sheet P1, as illustrated, but they also may be positioned on the face and on the back, so that the antennas 13 are spaced apart along a longitudinal axis X of the sheet or so that the antennas which remained positioned on either side of the center axis or the middle bisector Y of the sheet.

The certificates each comprise a support 11 with an antenna 13 (schematized in the drawings by only one winding for reasons of simplicity) linked to a microcircuit 15; whereas the document A, B, C (FIG. 7) can comprise several sheets with a determined format and articulated about a hinge.

According to one characteristic of the invention, the antennas 13 are dimensioned to a format of less than a half-sheet of the document. Then, the antennas cannot overlap and cause an over-coupling if the certificates are positioned appropriately at their location or position predetermined or provided in anticipation as mentioned in FIG. 7.

Figure 7:
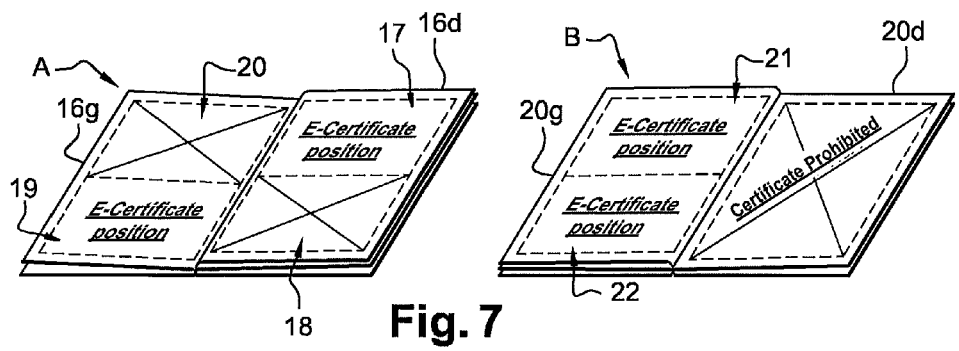
FIG. 7 illustrates two alternative documents adapted to the first embodiment of the transponders or e-certificate.

Thus, according to a characteristic of the invention, a document of the passport type as the one shown in FIG. 7 may comprise several sheets as that of FIG. 4 and electronic certificates positioned more particularly stuck on such sheets; the antennas of the certificates are dimensioned so they can be comprised in the surface of the half-sheet (FIG. 4).

According to the implementation of the invention, a maximum of two certificates are positioned on a sheet of this document, so that the antennas are spaced apart from each other along the longitudinal axis X of the sheet. Two alternative solutions hereinafter show this procedure.

In FIG. 7, an alternative passport provides for example predetermined places for the certificates so that they can be two at most distributed on the face and the back of the sheet, in a directive or a custom administrative regulation.

In the alternative document A, at the top of the right page 16d is a position 17, on half the page, the one 18 located at the bottom of the page being prohibited. Indications as "Certificate position" and "Certificate prohibited" or a cross can remind the customs officer the distribution to be complied with in the passport for the certificates. The last page 16g indicates a contrario a position of the certificate at the bottom 19 and a prohibited position 20 at the top of the page which is shown by a cross. This arrangement can be reported to the back of the right page 16d and so on.

In the variant of document B, one face out of two of each sheet is used to receive two certificates. As a matter of fact, each left page 20g of the document comprises, as shown in FIG. 4, two positions 21, 22 for the certificates, one above the other, in the page, each position covering approximately half a page.

On the contrary, the certificates are prohibited on the right page, which corresponds to the face of the left page 16g.

With the same principle, documents can be provided which already have predetermined positions for electronic certificates and take into account the general over-coupling of all the present transponders present together in the document or at least the over-coupling between transponders positioned on the face (right) and back (left) pages of a document, since the antennas are not positioned in overlapping positions as regards the projection of the same onto a plane or a page.

No overlapping for n transponders can be obtained if n antenna surfaces are distributed on the surface of a page. For 2n antennas having the same format as above, such 2n antennas will overlap once by projection even though they are distributed on several pages. For 2 antennas covering a page, as in the example, if 2×4 antennas are positioned in the document, they will mutually overlap 4 times in the whole closed document.

When the document is open and only one face is submitted to the field of the reader, only the transponders located on this page and behind the same can overlap or be over-coupling.

Figure 5:
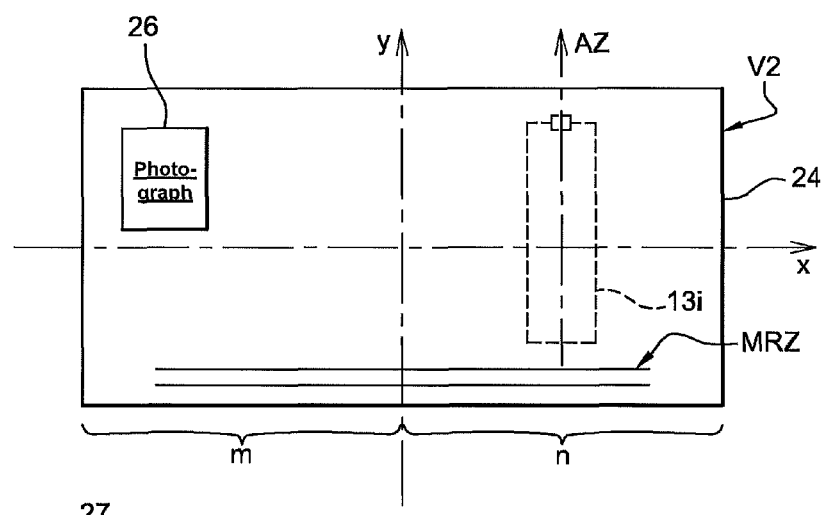
FIGS. 5 and 6 illustrate an e-certificate complying with a second embodiment respectively seen at the back and on the front.

In FIG. 5, the electronic certificates V2 have a support 24, which can be self-adhesive and have a format larger than above-mentioned and slightly less than or equal to that of a sheet of the document to be covered (for example 5 to 30% less). The format of the support is for example the format lD1.

According to one characteristic of implementation, the method comprises a step of defining two half-parts (m, n) of the support of the certificate on either part of a transversal center axis Y and of positioning the antenna inside a part, always the same from one certificate to the other. In the example, this part (n) is on the right of the certificate as in the Figure, and a photograph 26 can be positioned on the left.

The certificate comprises the antenna 13 fixed behind the support. It can be produced by known techniques, such as etching, embedded wire, screen printing, the deposition of conductive material, embroidery, etc. The antenna is substantially centered on the right half-part of the support and in any case limited to the half-part (n) of the support and being shifted with respect to the center axis Y along the longitudinal axis x.

Information, more particularly of the MRZ type, is mentioned in the lower margin of the support and is oriented longitudinally in the lower margin of the certificate. MRZ are coded data as per recommendations from the ICAO, which can be read by an optical reader making it possible to deduce a password to have access to the microcircuit of the passport or the certificate.

The holder's photograph 26 is positioned on the left side. In addition, a cover sheet can be added onto the support to receive more particularly graphic printings and customizations and/or security elements.

Figure 6:
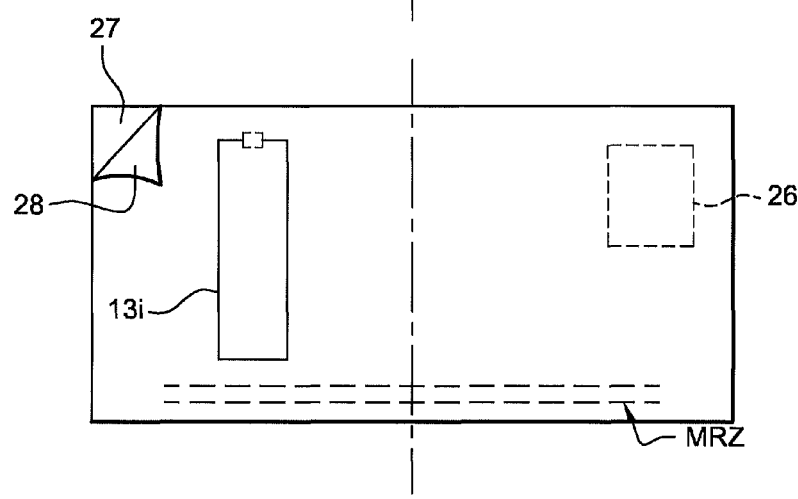

In FIG. 6, the antenna is visible at the back and an adhesive film 27 can be provided on the top with a removable protection film 28.

Therefore, in use, the certificates of FIGS. 5, 6 are fixed or applied to the face/or back of the sheets (FIGS. 8, 9) of document C. The certificates V2a, V2b are arranged identically with respect to the free longitudinal edge 30 of the sheet (MRZ adjacent to the free longitudinal edge 30 of the sheet or sheet P2 or opposite the hinge 32 of the document).

Figure 8:
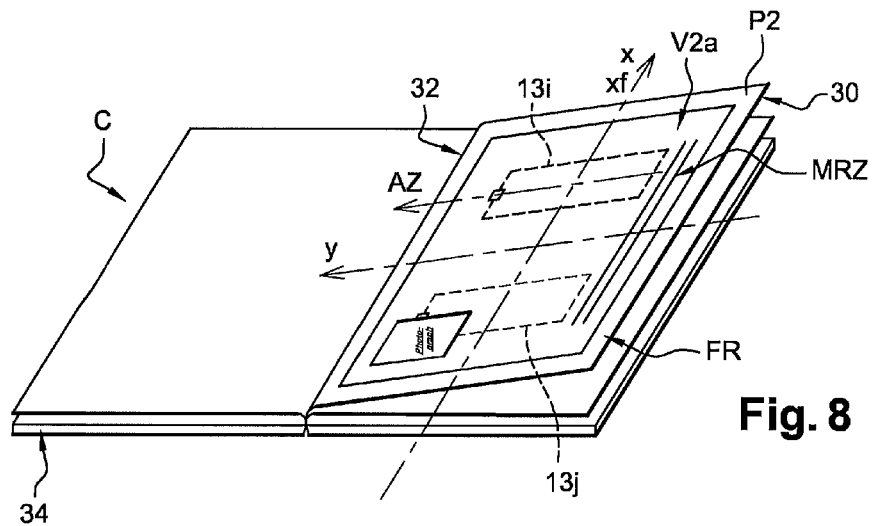
FIGS. 8 and 9 illustrate a travelling document arranged with two e-certificates complying with the second embodiment respectively on the face and the back of a page.
Figure 9:
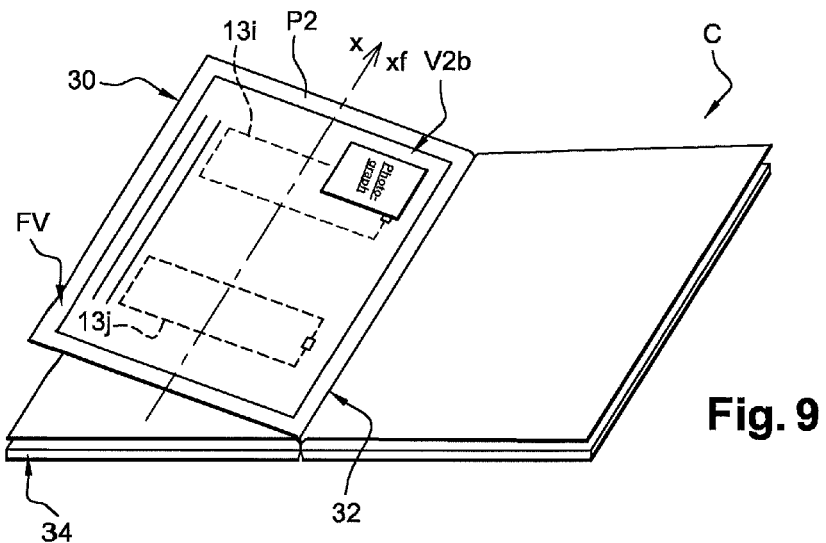

Then, accordance to another embodiment illustrated in FIGS. 8 and 9, the document C is obtained as previously, but this time comprising certificates on a support of a format slightly less than or equal to that of a sheet of the document, the support of the certificate defining two half-parts (m, n) on either side of a transversal center axis Y. The document C also comprises a cover 34, which can comprise or not an antenna for an electronic passport.

And according to one characteristic, the support comprises the antenna inside one part (n), always the same, from one certificate to another. In the example, in FIG. 8, the certificate V2A is applied on the right page or the front face FR of a sheet P2 of the document; the certificate is positioned so that the information and more particularly MRZ is positioned along the right margin of a page of the document on the longitudinal free edge 30.

Preferably, according to one characteristic, the antenna 13i of the certificate has a longitudinal axis AZ (along its longer length); and the antenna is positioned in the support 24 with the longitudinal axis AZ substantially parallel to the transversal bisector Y of the support or substantially perpendicular to the longitudinal center axis X of the support.

In position on the sheet P2, the antenna 13i is positioned in the support with the axis of the antenna AZ substantially perpendicular to a longitudinal axis of the sheet XF, itself parallel to or collinear with that of the support.

As per one characteristic, the certificates V2a, V2b are respectively positioned on the face and the back of the sheets of the document and identically arranged with respect to the free longitudinal edge 30 of the sheet. In the example, in FIG. 9, a second certificate V2b is positioned on the left page FV of the document (back) which belongs to the same sheet P2 of the document as before and which already has a first certificate V2a on the back thereof or on the right page (face)

The orientation of the certificate V2b is performed, so as to have the antenna 13j of the second certificate shifted or spaced apart from the antenna 13i of the first certificate V2a along the longitudinal axis of the sheet XF or the longitudinal axis of the support X. The MRZ information of the certificate V2b is positioned in the margin or close to the free edge 30 of the sheet as previously for the certificate V2a.

Then, thanks to the shifting the over-coupling effect produced by one of the two antennas on the other one is avoided. There is no mispositioning for the e-certificate since the MRZ is always on the free edge or on the longitudinal external edge of the sheets.

The antennas of the certificates are easily positioned on the correct side for a better reading of the certificates.

Such certificates can also be appropriate for passports comprising or not an antenna, for example positioned in the cover 34 of the passport or an internal page.

As regards the manufacturing, it is easy to produce a set or a batch of electronic certificates which will all be identical, as regards their structure or configuration. While being used, some certificates of this set (1, 2, 3, n) are associated with a travelling document comprising several sheets or at least one sheet. Such certificates comprise a support having a format slightly less than or equal to that of a sheet of document and each one bears an antenna related to a microcircuit; the support of the certificate defines two half-parts (m, n) positioned on either side of the transversal bisector Y thereof.

Contrary to the prior art, where the e-certificates could be randomly positioned on the support, according to one characteristic, the antennas of the certificates of this set are all positioned in the half-part (n) of the support located on the same side of the support, from one certificate to another.

Preferably, the antenna is positioned in this half-part (n) having its longitudinal axis AZ substantially parallel to the transversal bisector, so that the antenna of the certificate keeps, as best as possible, the distances with respect to another certificate which would be applied behind it (or even on another sheet) and which would have its constituents (MRZ, photograph . . . ) oriented in the same direction as the first one. Then the risk of over-coupling is even more reduced since the spacing between the antennas according to the axis XF is more important.

Figure 10:
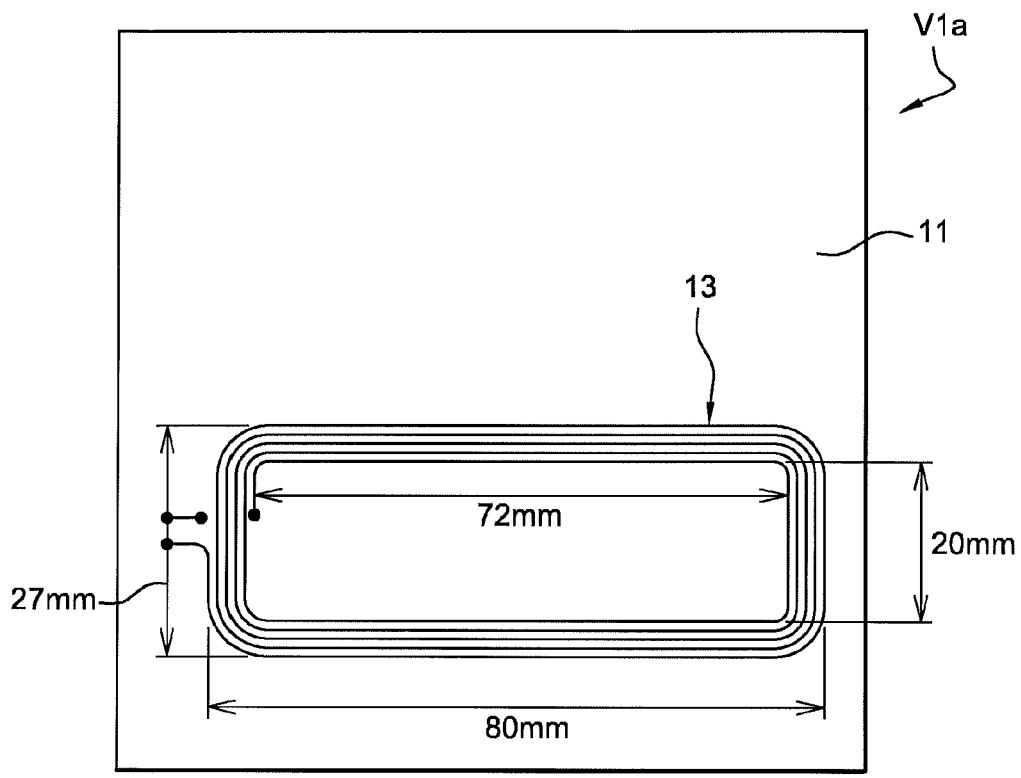
FIG. 10 illustrates a transponder antenna for a certificate in greater details, with preferred values of dimensions.

In FIG. 10, an electronic certificate (the chip is not shown) V1a comprises a support 11 and comprises preferred particularities for a correct communication, according to characteristics of the invention. According to such preferred characteristics, the transponder may comprise an antenna 13 having from 3 to 6 windings, preferably 5 windings, here obtained by etching. The surface inside the external winding can be between 17×65 and 37×95 mm, here preferably equal to approximately 27×80 mm; the width of the windings can be between 0.22 and 0.58 mm, here preferably between 0.32 and 0.48 mm. The space between the windings can be between 0.2 and 0.8 mm, here preferably between 0.4 and 0.6 mm.

According to an advantageous position, each electronic certificate is positioned in a support, for example a sheet having substantially the format of a document or slightly less. However, in the application to the passport, the support has a format lD1 or slightly less. The important thing, according to a preferred embodiment, lies in not leaving too many possibilities to the user when fixing or applying the certificate into the document. It is important for the longitudinal distance between the certificate and the edge of the sheet (or the final support) to be less than the distance between the antenna and the axis Y of the certificate 24. Then, even though the certificates are positioned in a position tending to place the antennas closer to the transversal center axis of the sheet, there will be no overlapping.

Then, thanks to the invention, it is possible to use the application of the electronic certificate with a number of electronic certificates over five. The preferred characteristics mentioned here-above and visible in FIG. 10 make it possible to read at least 8 or 10 transponders in compliance with the ICAO's certifications.

The method of the invention may be the subject of a standard or a regulation so as to be adopted or complied with by everybody for the optimal reading of electronic certificates.

The invention claimed is:

1. A method for arranging electronic certificates to facilitate reading by an electromagnetic field reader, said certificates each comprising a support bearing an antenna linked to a microcircuit and positioned in a document, the document comprising sheets of a determined format articulated about a hinge, the antennas being dimensioned to a format less than a half sheet,
   wherein the certificates are arranged in the document at most in pairs on a sheet with the antennas spaced apart along a longitudinal axis of the sheet, and
   the certificates are positioned on diagonally opposite corners of the sheet, with the certificates being arranged in an identical way with respect to the free longitudinal edge of the sheet.

2. A method according to claim 1, wherein the certificates each have a support with a format slightly less than or equal to that of a sheet of the document, and wherein:
   two half-parts of the support of the certificate are defined on either side of a transverse center axis and the antennas are placed inside one of said parts, which is the same part from one certificate to another.

3. A method according to claim 2, wherein the certificates comprise information of the Machine Readable Zone (MRZ) type positioned longitudinally in the margin of the support, with each certificate being positioned so that the MRZ is close to the free longitudinal edge of the sheet of the document.

4. A method according to claim 2, wherein the antenna of the certificate has a longitudinal axis, and wherein the antenna is positioned in the support with the longitudinal axis substantially parallel to the transverse right bisector of the support and/or of the sheet.

5. A set of electronic certificates to be associated with a document comprising several sheets, with said certificates comprising a support having a format slightly less than or equal to that of a sheet of the document and bearing an antenna linked to a microcircuit, the support of the certificate defining two half-parts positioned on either side of a transverse bisector,
   wherein the antennas of the certificates are all positioned in the same half-part, which is located on the same side of the support for each certificate, and
   the antenna comprises 5 windings,
   the surface inside the external winding is approximately 27×80 mm,
   the width of the windings is between 0.32 mm and 0.48 mm, and
   the inter-winding space is between 0.4 and 0.6 mm.

6. A set of electronic certificates according to claim 5, wherein the antenna is positioned in the half-part with the longitudinal axis thereof substantially parallel to the transverse bisector of the support.

7. A document comprising several sheets and electronic certificates provided with antennas on the sheets, the antennas and the certificates being dimensioned so as to be contained within the surface of a half-sheet,
   wherein the certificates are so arranged as to be positioned at most in pairs on a sheet without any overlapping while being positioned on either side of a transverse center axis of the sheet so that the antennas are spaced apart along a longitudinal axis of the sheet, and
   the certificates are positioned on diagonally opposite corners of the sheet and arranged in an identical way with respect to the free longitudinal edge of the sheet.

8. A document according to claim 7, wherein the certificates have a support with a format slightly less than or equal to that of a sheet of the document, with the support of the certificate defining two half-parts on either side of a transverse center axis,
   and wherein the support comprises the antenna disposed within a part, which is always the same from one certificate to another.

* * * * *